United States Patent
Kobayashi

(10) Patent No.: US 8,647,009 B2
(45) Date of Patent: Feb. 11, 2014

(54) SECURING MEMBER

(75) Inventor: Shuichi Kobayashi, Takahama (JP)

(73) Assignee: Yanegijutsukenkyujo Co., Ltd., Takahama-shi, Aichi (JP)

(*) Notice: Subject to any disclaimer, the term of this patent is extended or adjusted under 35 U.S.C. 154(b) by 0 days.

(21) Appl. No.: 13/542,844

(22) Filed: Jul. 6, 2012

(65) Prior Publication Data

US 2012/0275844 A1 Nov. 1, 2012

Related U.S. Application Data

(63) Continuation of application No. PCT/JP2010/066180, filed on Sep. 17, 2010.

(30) Foreign Application Priority Data

Feb. 2, 2010 (JP) .................................. 2010-021476

(51) Int. Cl.
*F16B 7/04* (2006.01)

(52) U.S. Cl.
USPC .............. 403/7; 403/252; 403/167; 52/173.3; 52/710; 248/237

(58) Field of Classification Search
USPC ............ 248/223.41, 225.11, 500, 237, 298.1, 248/340, 499; 16/95 R, 95 W, 94 R; 52/710, 52/173.3; 403/167, 7, 168, 252, 256, 257, 403/259, 260, DIG. 9
See application file for complete search history.

(56) References Cited

U.S. PATENT DOCUMENTS

| 4,084,289 | A | * | 4/1978 | Naimo | .......................... 16/96 R |
| 5,487,518 | A | * | 1/1996 | McCraney et al. | ...... 248/225.11 |
| 5,571,338 | A | * | 11/1996 | Kadonome et al. | ........... 136/251 |
| 5,706,617 | A | * | 1/1998 | Hirai et al. | ................... 52/173.3 |

(Continued)

FOREIGN PATENT DOCUMENTS

| JP | 3045252 U | 11/1997 |
| JP | 2004-324181 A | 11/2004 |
| JP | 2005-291677 A | 10/2005 |

OTHER PUBLICATIONS

International Search Report of PCT/JP2010/066180, mailing date Oct. 19, 2010.

(Continued)

*Primary Examiner* — Daniel P. Stodola
*Assistant Examiner* — Matthew R McMahon
(74) *Attorney, Agent, or Firm* — Westerman, Hattori, Daniels & Adrian, LLP

(57) ABSTRACT

A securing member includes a flat base portion, a flat top board portion which is supported by a pair of top board supporting portions erected on the base portion, a long hole which penetrates through the top board portion and of which both ends are closed, a bolt having a head which does not pass through the long hole, and of which shaft is inserted through the long hole in a state where the head is located lower than the top board portion and is to be inserted through a supporting hole provided on a supporting member of a solar battery module, a head insertion hole through which the head of the bolt passes, penetrates through the top board portion, and communicates with the long hole, securing holes which are located on a line obtained by projecting a center line of the long hole, and penetrate through the base portion.

2 Claims, 10 Drawing Sheets

(56) References Cited

U.S. PATENT DOCUMENTS

| | | | | |
|---|---|---|---|---|
| 5,746,029 A * | 5/1998 | Ullman | | 52/27 |
| 6,105,317 A * | 8/2000 | Tomiuchi et al. | | 52/173.3 |
| 6,309,132 B1 * | 10/2001 | Jakob et al. | | 403/200 |
| 6,588,722 B2 * | 7/2003 | Eguchi et al. | | 248/429 |
| 7,758,011 B2 * | 7/2010 | Haddock | | 248/500 |
| 7,797,883 B2 * | 9/2010 | Tarbell et al. | | 52/27 |
| 8,100,600 B2 * | 1/2012 | Blum | | 403/256 |
| 8,404,963 B2 * | 3/2013 | Kobayashi | | 136/244 |
| 2007/0194191 A1 * | 8/2007 | Persson | | 248/225.11 |
| 2009/0224119 A1 * | 9/2009 | Heffernan | | 248/225.11 |
| 2010/0192505 A1 * | 8/2010 | Schaefer et al. | | 52/653.2 |
| 2011/0073733 A1 * | 3/2011 | Hartelius et al. | | 248/298.1 |

OTHER PUBLICATIONS

Written Opinion of PCT/JP2010/066180, mailing date Oct. 19, 2010.

* cited by examiner

SECURING MEMBER

This application is a continuation of International Application No. PCT/JP2010/066180 filed on Sep. 17, 2010 claiming priority upon Japanese Patent Application No. 2010-021476 filed Feb. 2, 2010, of which full contents are incorporated herein by reference.

BACKGROUND OF THE INVENTION

1. Field of the Invention

The present invention relates to a securing member which is used for securing a member which supports a solar battery module onto roof tile when the solar battery module is installed on roof.

2. Description of the Related Art

When a solar battery module is installed on roof of a building, long crosspieces are mounted on roof tile so as to be assembled in a form of parallel crosses and the solar battery module is secured onto the roof tile through the crosspieces, in general. With this, there is an advantage that spaces between the crosspieces can be adjusted in accordance with a size of the solar battery module by adjusting intersecting positions of the crosspieces extending in one direction with respect to the crosspieces extending in the other direction. On the contrary, since the crosspieces are long, there is a problem that a large amount of labor and time are required for adjusting the positions. In addition, since a large number of crosspieces are necessary for assembling the crosspieces in a form of parallel crosses, there also arises a problem that the number of parts is increased and cost is also increased.

On the other hand, a position of the roof tile such as slate at which a securing member can be mounted is limited. Therefore, if the securing member for installing a solar battery module is tried to be mounted directly on the roof tile, a position at which the securing member should be mounted overlaps with a position of the roof tile at which the securing member cannot be mounted depending on a relationship between a size of the solar battery module and a pitch of the roof tiles. Accordingly, the securing member cannot be mounted on the roof tile in some case.

A solar battery apparatus which makes it possible to adjust a position of a securing member to be mounted on roof tile with respect to a solar battery panel has been proposed (see, Patent Document 1; Japanese Patent Application Laid-open No. 2004-324181). In the solar battery apparatus, as illustrated in FIG. 15, a groove 202 into which a head 203A of a bolt is inserted is provided on a securing member 200 to be mounted on roof tile, and locking portions 215 which project to the lower side are provided on a thrusting tool 210 having a through hole 211 through which a shaft portion 203B of a bolt is inserted.

Further, when the solar battery panel is secured onto roof, the securing member 200 is mounted on the roof tile and the head 203A of the bolt is made to slide in the groove 202. Thereafter, the thrusting tool 210 in a state where the shaft portion 203B of the bolt is inserted through the through hole 211 and the locking portions 215 are engaged with slide grooves (not illustrated) formed on a peripheral edge of the solar battery panel is fastened from the upper side and the lower side with nuts 122, 218. With this, the solar battery panel is pressurized from the upper side by the thrusting tool 210, is supported by the securing member 200 through the bolt 203, and is secured onto the roof tile through the securing member 200 further.

SUMMARY OF THE INVENTION

However, the above securing member 200 requires the solar battery panel to have a specific configuration in accordance with a configuration of the securing member. That is to say, when the securing member 200 is used, the slide grooves which engage with the locking portions 215 need to be formed on the peripheral edge of the solar battery panel. Therefore, a securing member which can be generally used for a common solar battery module without requiring the solar battery module to have a specific configuration has been desired.

In addition, on the securing member 200, a cover member 220 is mounted so as to cover an upper surface of the securing member 200. A hole portion 221 through which the shaft portion 203B of the bolt is inserted is punctured on the cover member 220. The cover member 220 is mounted for limiting a range where the bolt 203 can slide in order to prevent the bolt 203 sliding in the groove 202 from being detached from the groove 202 having an opening end. With this configuration, there has arisen a problem that the number of parts is increased so that an installation operation is troublesome and cost is increased.

In view of the above circumstances, an object of the present invention is to provide a securing member having the reduced number of parts, which can secure a solar battery module onto roof tile at an appropriate position, and can be generally used for a common solar battery module.

In order to achieve the above object, a securing member according to an aspect of the invention "includes a flat plate-like base portion which is to be mounted on roof tile, a flat plate-like top board portion which is supported at a position higher than the base portion by a pair of top board supporting portions erected on the base portion, a long hole portion which penetrates through the top board portion and of which both ends are closed, a bolt which includes a shaft portion having such a size that the shaft portion passes through the long hole portion and a head having such a size that the head does not pass through the long hole portion, and of which shaft portion is inserted through the long hole portion in a state where the head is located at a position lower than the top board portion and is to be inserted through a supporting hole portion provided on a supporting member of a solar battery module, a head insertion hole which has such a size that the head of the bolt passes through the head insertion hole, penetrates through the top board portion, and communicates with the long hole portion at one end of the long hole portion, and a securing hole portion which is located on a line obtained by projecting a center axis line of the long hole portion on the base portion, and penetrates through the base portion."

The expressions "up" and "down" in the specification and a scope of the invention are used while a side of the securing member according to the aspect of the invention, which is mounted on the roof tile, is set to a "down" side.

The expression "roof tile" indicates a roof surface material exemplified by a metal-based plate such as a slate-based plate and a galvanized plate, a wood plate and a resin-based plate, and a roof structural material such as roofboard and rafter.

As the "supporting member of the solar battery module", a table-like supporting member on which a frame body which supports a side edge of a solar battery panel on the solar battery module is installed while sandwiching the frame body, and a supporting member which pressurizes the frame body of the solar battery module installed on the top board portion of the securing member according to the aspect of the invention against the top board portion from the upper side can be exemplified.

With the above configuration, the base portion is mounted on the roof tile, the shaft portion of the bolt with the inverted head in a state where the shaft portion is inserted through the long hole portion is further inserted through the supporting hole portion of the supporting member, and then, is fastened with a nut. With this, the supporting member can be secured onto the roof tile through the securing member. Eventually, the solar battery module supported by the supporting member can be secured onto the roof tile. At this time, the bolt can be made to slide along the long hole portion. Therefore, the base portion and the supporting member can be made to slide relatively. In other words, the base portion and the supporting member can be separated from or made closer to each other by a length of the long hole portion. With this, the solar battery module can be supported by the supporting member in a balanced manner in a state where the securing member is mounted on the roof tile at an appropriate position.

Note that the securing hole portion is punctured on the base portion. Therefore, the securing member can be mounted on the roof tile by a fastener member such as a nail or a screw nail, which is inserted through the securing hole portion. In the aspect of the invention, the securing hole portion "is located on a line obtained by projecting a center axis line of the long hole portion on the base portion." That is, the securing hole portion is located on a virtual line just under a center axis line of the long hole portion. Therefore, the securing member is attached to the roof tile on the same axis as a portion on which the securing member receives load supported by the supporting member through the bolt. Therefore, the solar battery module can be secured onto the roof tile through the securing member stably. In particular, if the securing hole portion is adjusted to be located on a structural material such as rafter, the securing member is supported by the structural member stably and installation strength of the solar battery module on the roof tile through the securing member and the supporting member can be enhanced and it is preferable.

Further, both ends of the long hole portion are closed. Therefore, even if fastening of the bolt is loosened, the bolt stops at an eaves-side end of the long hole portion automatically. That is to say, a range in which the bolt slides is limited without separately providing a member such as a cover member as described in the above Patent Document 1. The head of the bolt does not pass through the long hole portion but the head insertion hole having such a size that the head can pass therethrough communicates with the long hole portion. Therefore, the head of the inverted bolt can be located at a position lower than the top board portion through the head insertion hole.

In addition, the securing member according to the aspect of the invention does not require the solar battery module to have a specific configuration. Therefore, the securing member can be generally used for a common solar battery module. In addition, a specific configuration of the supporting member for supporting the solar battery module is not also limited as long as the supporting hole portion is provided thereon. Therefore, the solar battery module can be secured onto the roof tile by using various types of supporting members.

In the securing member according to the aspect of the invention, it is preferable that "the pair of top board supporting portions be erected from the base portion at positions distanced from a pair of sides of the base portion, and the base portion include a plurality of auxiliary securing hole portions which penetrate through base side edge portions between the top board supporting portions and the sides, and groove portions which are formed along boundaries between the base side edge portions and the top board supporting portions," in addition to the above configuration.

In addition to attachment of the securing member to the roof tile by the fastener member inserted through the securing hole portion as described above, the securing member can be also attached to the roof tile by the fastener members inserted through the "auxiliary securing hole portions." Accordingly, the securing member can be secured onto the roof tile more firmly. Eventually, an installation strength of the solar battery module on the roof tile can be enhanced.

Note that the "base side edge portions" on which the auxiliary securing hole portions are provided are portions at outer sides with respect to the top board supporting portions and are not covered by the top board portion. Therefore, rainwater flows down the base side edge portions due to rainfall. At this time, the rainwater tends to flow into the groove portions formed along the boundaries between the base side edge portions and the top board supporting portions. This makes it possible to further decrease a risk that the rainwater enters through the auxiliary securing hole portions. It is to be noted that waterproof processing can be performed on the auxiliary securing hole portions into which the fastener members have been inserted by filling the auxiliary securing hole portions with calking agents.

In the securing member according to the aspect of the invention, it is preferable that "each of the pair of top board supporting portions include a standing wall portion which extends to the upper side from the base portion, a flat plate-like step portion which extends to the side of the top board portion from a middle point of the standing wall portion and is located at a position lower than the top board portion, and a second standing wall portion which extends to the upper side from the step portion so as to reach the top board portion" in the above configuration.

With the above configuration, one pair of step portions are provided at both outer sides of the top board portion at one stage lower positions. Grooves having concaved cross sections (hereinafter, referred to as "concave grooves") are formed by portions of the standing wall portions, which are higher than the step portions (hereinafter, referred to as "standing wall upper portions"), the step portions, and the second standing wall portions. Accordingly, wire rods such as output electric wires from the solar battery module and an antenna line from a television antenna can be accommodated in the concave grooves. These wire rods drawn on the roof surface material can be collected simply in a lower space of the solar battery module.

In the securing member according to the aspect of the invention, it is preferable that "the standing wall portions reach the same height as the top board portion and include standing wall portion projecting pieces which extend to the side of the top board portion from upper ends of the standing wall portions, and the top board portion include top board portion projecting pieces which extend to the side of the standing wall portions from intersections between the top board portion and the second standing wall portions and are opposed to the standing wall portion projecting pieces" in addition to the above configuration.

In the above configuration, openings of the above concave grooves are narrowed by projecting amounts of the standing wall portion projecting pieces and the top board portion projecting pieces. Accordingly, by using second bolts each including a shaft portion which passes through between the standing wall portion projecting piece and the top board portion projecting piece and a head having such a size that the head does not pass through therebetween, the second bolts can be arranged such that the shaft portions are inserted through between the standing wall portion projecting pieces and the top board portion projecting pieces in a state where the second bolts are inverted and the heads are located in the concave grooves. With this, the supporting member can be connected to the securing member with the second bolts more firmly in addition to the above bolt. Eventually, the solar battery module supported by the supporting member can be surely supported by the securing member and secured onto the roof tile.

Further, cables can be supported by using commercially available cable holders by using a fact that the openings of the concave grooves are narrowed. That is to say, as each of the commercially available cable holders, a cable holder which is formed with an elastic member such as a resin, and includes a ring-shaped or C-shaped cable holding portion for holding the cable and a hook-like locking claw is used. If the locking claws of the cable holders are elastically deformed and are pressed into the concave grooves, the locking claws are deformed to be returned and locked by the standing wall portion projecting pieces and the top board portion projecting pieces. Therefore, the cable holding portions are secured in a state of being located at positions which are higher than the standing wall portion projecting pieces and the top board portion projecting pieces. With this, wire rods can be inserted through the cable holding portions so as to be held.

DESCRIPTION OF EXEMPLARY EMBODIMENTS

Figure 1A:
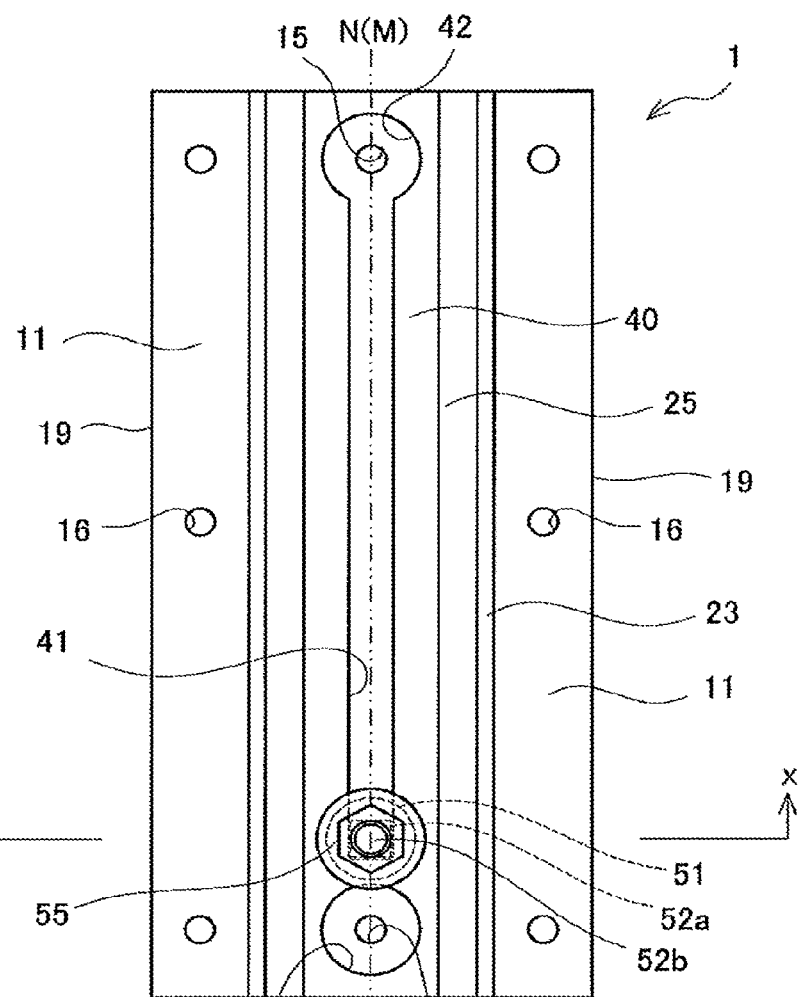
FIG. 1A is a plan view and FIG. 1B is a front view illustrating a securing member according to a first embodiment of the invention.

Hereinafter, a securing member 1 as a first embodiment of the invention is described with reference to FIG. 1A to FIG. 7.

The securing member 1 includes a flat plate-like base portion 10, a flat plate-like top board portion 40, a long hole portion 41, a bolt 50, a head insertion hole 42, and securing hole portions 15. The base portion 10 is to be mounted on roof tile. The top board portion 40 is supported at a position higher than the base portion 10 by a pair of top board supporting portions 20 erected on the base portion 10. The long hole portion 41 penetrates through the top board portion 40 and both ends of the long hole portion 41 are closed. The bolt 50 includes a shaft portion 52 which has such a size that the shaft portion 52 passes through the long hole portion 41 and a head 51 which has such a size that the head 51 does not pass through the long hole portion 41. The shaft portion 52 of the bolt 50 is inserted through the long hole portion 41 in a state where the head 51 is located at a position lower than the top board portion 40. At the same time, the shaft portion 52 of the bolt 50 is to be inserted through a supporting hole portion provided on a supporting member of a solar battery module. The head insertion hole 42 has such a size that the head 51 of the bolt 50 passes through the head insertion hole 42, and penetrates through the top board portion 40. Further, the head insertion hole 42 communicates with the long hole portion 41 at one end of the long hole portion 41. The securing hole portions 15 are located on a line obtained by projecting a center axis line N of the long hole portion 41 on the base portion 10 and penetrate through the base portion 10.

Further, one pair of top board supporting portions 20 are erected from the base portion 10 at positions distanced from a pair of long sides 19 of the base portion 10. The base portion 10 includes a plurality of auxiliary securing hole portions 16 and groove portions 30. The auxiliary securing hole portions 16 penetrate through base side edge portions 11 between the top board supporting portions 20 and the long sides 19. The groove portions 30 are formed along boundaries between the base side edge portions 11 and the top board supporting portions 20. Further, each of one pair of top board supporting portions 20 includes a standing wall portion 21, a flat plate-like step portion 25, and a second standing wall portion 26. The standing wall portion 21 extends to the upper side from the base portion 10. The step portion 25 extends to the side of the top board portion 40 from a middle point of the standing wall portion 21 and is located at a position lower than the top board portion 40. The second standing wall portion 26 extends to the upper side from the step portion 25 so as to reach the top board portion 40. In addition, the standing wall portions 21 reach the same height as the top board portion 40 and include standing wall portion projecting pieces 23. The standing wall portion projecting pieces 23 extend to the side of the top board portion 40 from upper ends of the standing wall portions 21. The top board portion 40 includes top board portion projecting pieces 43. The top board portion projecting pieces 43 extend to the side of the standing wall portions 21 from intersections between the top board portion 40 and the second standing wall portions 26 and are opposed to the standing wall portion projecting pieces 23.

As will be described more in detail, any of the base portion 10, the top board portion 40 and the step portions 25 are rectangular flat plates when seen from the above. Lengths of the top board portion 40 and the step portions 25 in the lengthwise direction are equal to a length of the base portion 10 in the lengthwise direction. Further, both of the standing wall portions 21 and the second standing wall portions 26 extend to be orthogonal to the base portion 10 and are rectangular flat plates. Lengths of the standing wall portions 21 and the second standing wall portions 26 in the lengthwise direction are equal to the length of the base portion 10 in the lengthwise direction. A virtual line passing through a center point of the base portion 10 and extending in the lengthwise direction is referred to as "base portion center line M." One pair of standing wall portions 21, one pair of step portions 25, and one pair of second standing wall portions 26 are provided to be line-symmetric with respect to the base portion center line M.

The long hole portion 41 penetrating through the top board portion 40 is a hole portion elongated in the lengthwise direction of the top board portion 40 (that is to say, lengthwise direction of the base portion 10). The long hole portion 41 is provided on the top board portion 40 at a center in the width direction thereof perpendicular to the lengthwise direction. Accordingly, a line obtained by projecting the center axis line N of the long hole portion 41 on the base portion 10 is identical to the base portion center line M in the embodiment. The head insertion hole 42 is provided so as to communicate with a ridge-side end of the long hole portion 41 when the securing member 1 is mounted on roof tile.

The bolt 50 has the head 51 of a circular shape having a diameter smaller than the head insertion hole 42. The shaft portion 52 of the bolt 50 is constituted by a thread shaft portion 52b having a columnar shape and a prismatic shaft portion 52a having a quadrangular prism shape. A thread groove is formed on an outer circumferential surface of the thread shaft portion 52b. The prismatic shaft portion 52a is formed on a root of the head 51. A width of the prismatic shaft portion 52a is slightly smaller than a width of the long hole portion 41. Therefore, the bolt 50 slides along the long hole portion 41 in a non-rotatable manner while an outer circumferential surface of the prismatic shaft portion 52a abuts against an inner circumferential surface of the long hole portion 41.

Two securing hole portions 15 are provided on the base portion 10 on the base portion center line M. One of them is provided on the base portion 10 in the vicinity of an eaves-side end side and the other of them is provided on the base portion 10 in the vicinity of a ridge-side end side. A region on the base portion 10, which is closer to the base portion center line M, is covered by the top board portion 40. Therefore, a hole portion is provided on the top board portion 40 in order to make an operation of inserting fastener members 71 such as screw nails through the securing hole portions 15 provided on the region convenient. That is to say, an operation hole portion 47 having enough size to insert the head of the fastener member 71 therethrough is provided on the top board portion 40 at a position above the securing hole portion 15 at the eaves side in a penetrating manner. The operation hole portion 47 is provided so as to be separated from the eaves-side end of the long hole portion 41 so as not to communicate with the long hole portion 41.

On the other hand, the securing hole portion 15 at the ridge side is provided on the base portion 10 at a position under the head insertion hole 42. Therefore, the head insertion hole 42 can also serve as an operation hole.

Figure 1B:
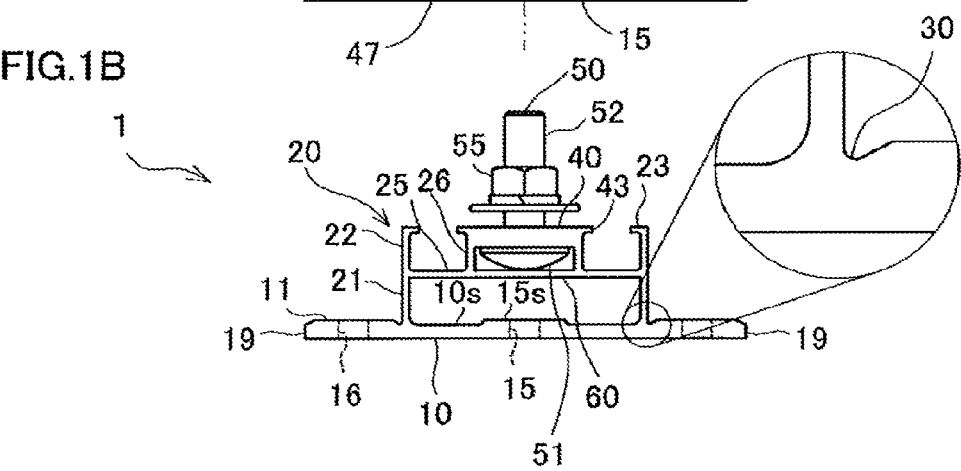
Figure 2:
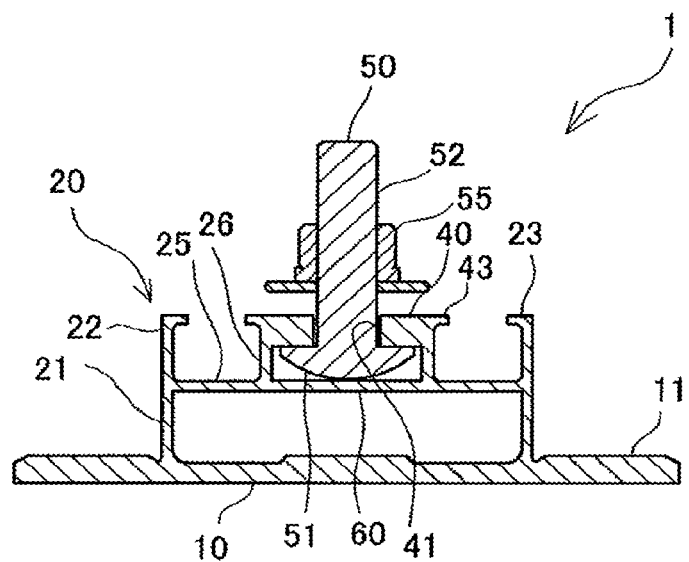
FIG. 2 is a view illustrating a cross section cut along a line X-X in FIG. 1A.
Figure 3:
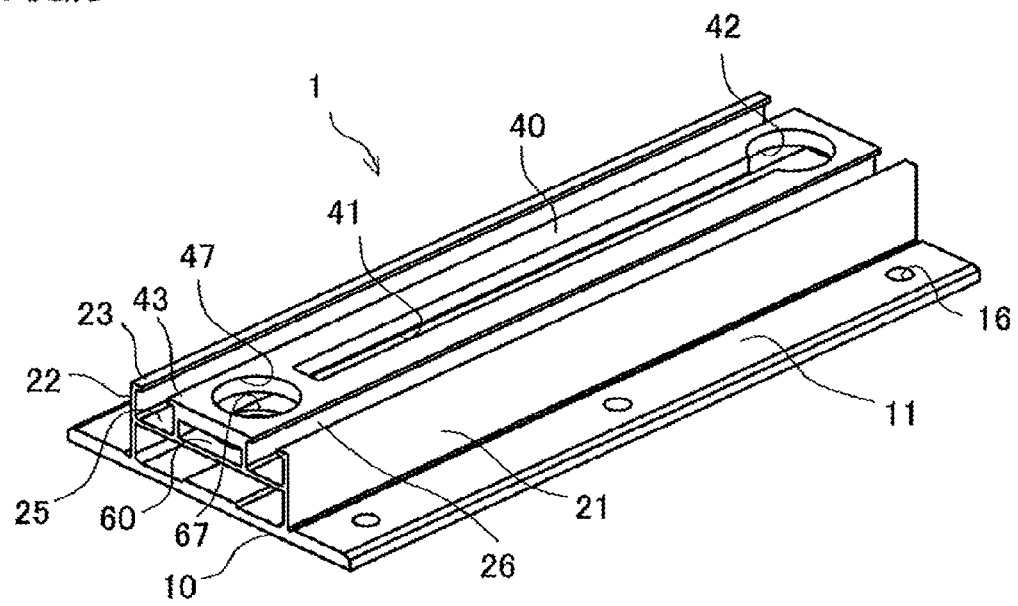
FIG. 3 is a perspective view illustrating the securing member in FIGS. 1A and 1B.
Figure 4:
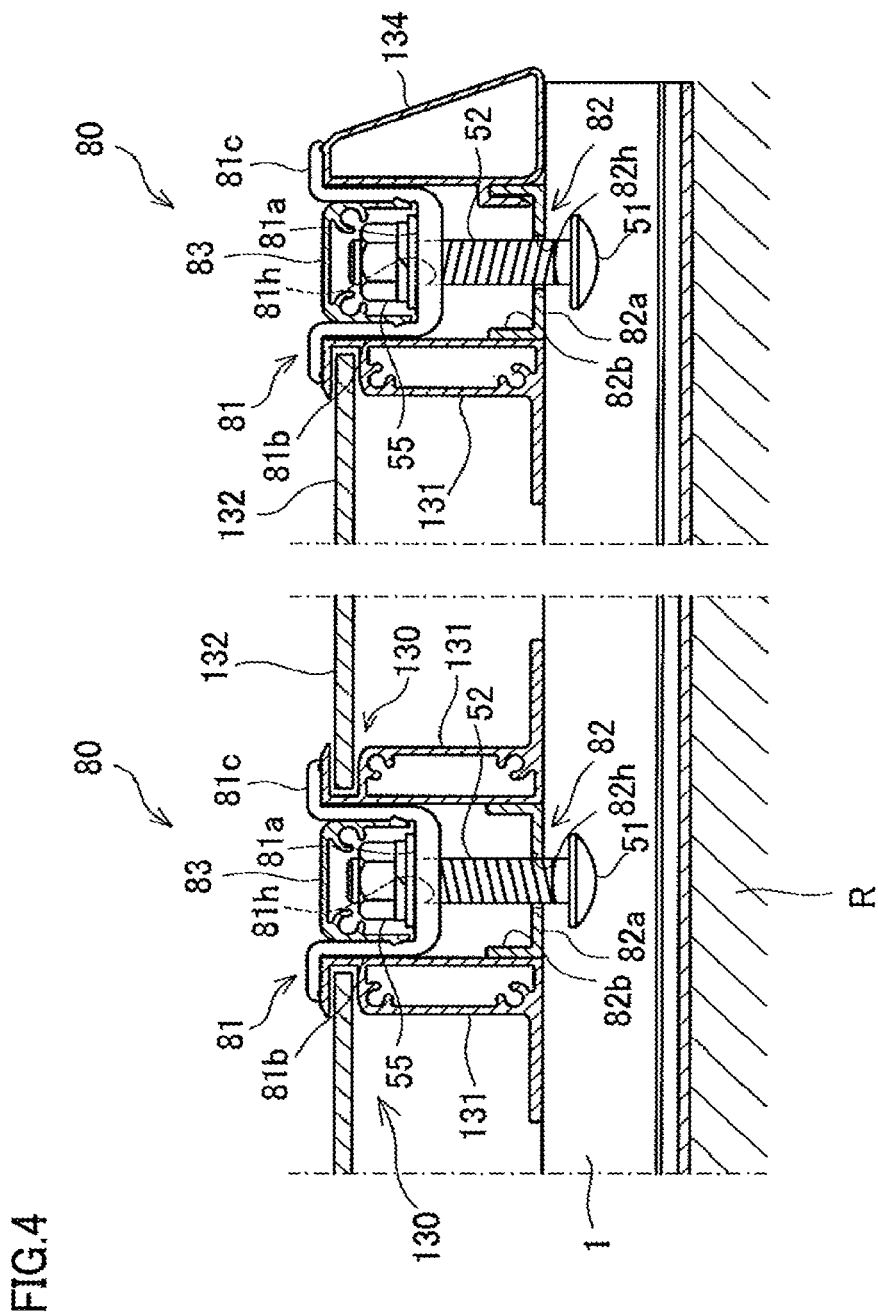
FIG. 4 is a view illustrating an example of securing of a solar battery module onto roof tile by the securing member in FIGS. 1A and 1B.

It is to be noted that opening edges 15s of the securing hole portions 15 on an upper surface of the base portion 10 are higher than an upper surface 10s of other positions on the base portion 10 (see, FIG. 1B).

Further, in the embodiment, a connecting portion 60 which connects lower ends of one pair of second standing wall portions 26 is provided. The connecting portion 60 secures rigidity of the top board portion 40 of which strength tends to be lower because the long hole portion 41, the head insertion hole 42, and the operation hole portion 47 are punctured. In addition, a state where the shaft portion 52 of the inverted bolt 50 is inserted through the long hole portion 41 is held by the connecting portion 60. That is to say, a distance between an upper surface of the connecting portion 60 and a bottom surface of the top board portion 40 is set to such a length that the outer circumferential surface of the prismatic shaft portion 52a abuts against the inner circumferential surface of the long hole portion 41 in a state where the head 51 of the bolt 50 is installed on the connecting portion 60. It is to be noted that a second operation hole portion 67 is provided on the connecting portion 60 at a position under the operation hole portion 47 in a penetrating manner (see, FIG. 3).

The securing member 1 having the above-described configuration except the bolt 50 can be manufactured by cutting an extrusion molded material made of a metal such as an aluminum alloy into a predetermined length and puncturing the long hole portion 41, the head insertion hole 42, the securing hole portions 15, the auxiliary securing hole portions 16, the operation hole portion 47, and the second operation hole portion 67. Alternatively, the securing member 1 except the bolt 50 can be formed by metal casting or injection molding using a synthetic resin. Note that when the synthetic resin is used, weather resistance of the securing member 1 can be enhanced by covering it with a coating agent having excellent weather resistance. Further, if a fiber-reinforced plastic is used, the securing member 1 having excellent weather resistance and high strength can be manufactured.

Next, securing of a solar battery module onto roof tile through a supporting member and the securing member 1 is described by taking a specific example of the supporting member. At first, a case where a type of a supporting member 80 which pressurizes a frame body of the solar battery module from the upper side is used is described with reference to FIG. 4. A solar battery module 130 includes a flat plate-like solar battery panel 132 and a frame body 131. The solar battery panel 132 has a plurality of solar battery cells and a rectangular shape when seen from the above. The frame body 131 supports outer circumferential sides of the solar battery panel 132. An output electric wire (not illustrated) is connected to a bottom surface of the solar battery panel 132.

The supporting member 80 includes a pressurizing member 81 and a spacer member 82. The pressurizing member 81 includes a flat plate-like base plate portion 81a, a pair of standing plate portions 81b, abutment portions 81c, and a first supporting hole portion 81h. The pair of standing plate portions 81b extend to the upper side from both ends of the base plate portion 81a. The abutment portions 81c extend from upper ends of the standing plate portions 81b in a direction of being separated from each other so as to be in parallel with the base plate portion 81a. The first supporting hole portion 81h penetrates through a center of the base plate portion 81a and the shaft portion 52 of the bolt 50 of the securing member 1 is inserted through the first supporting hole portion 81h. Further, the spacer member 82 includes a flat plate-like base portion 82a, a pair of side portions 82b, and a second supporting hole portion 82h. The base portion 82a has a width which is slightly longer than a distance between outer surfaces of the pair of standing plate portions 81b. The pair of side portions 82b extend to the upper side from both ends of the base portion 82a. The second supporting hole portion 82h penetrates through a center of the base portion 82a and the shaft portion 52 of the bolt 50 of the securing member 1 is inserted through the second supporting hole portion 82h. Note that the "first supporting hole portion 81h" of the pressurizing member 81 and the "second supporting hole portion 82h" of the spacer member 82 correspond to "supporting hole portion" according to the invention.

The pressurizing member 81 and the spacer member 82 are obtained by cutting a long member having a single cross section into predetermined lengths. Each length can be set to approximately double of a width of the base portion 10 of the securing member 1, for example.

The solar battery module 130 is secured onto roof tile R with the securing member 1 as follows by using the supporting member 80 having the above-described configuration. The following description is intended to explain a configuration and a principle in which the solar battery module 130 is secured onto the roof tile R through the supporting member 80 and the securing member 1 and is not intended to explain processing procedures. At first, the securing member 1 is mounted on the roof tile R at an appropriate position. For example, when the roof tile R is a slate plate, there are limitations that nothing can be mounted on a region within 70 mm from an eaves-side end side of each slate plate and a region within 50 mm from a boundary between the slate plate and an adjacent slate plate to be laid. Further, it is more desirable that the fastener members 71 to be inserted through the securing hole portions 15 of the base portion 10 can penetrate through a roof surface material such as a slate plate and a roofboard so as to be attached to rafter. Arrangement of the securing member 1 is determined from this viewpoint and the base portion 10 is attached to the roof tile R with the fastener members 71 inserted through the securing hole portions 15 and the fastener members 71 inserted through the auxiliary securing hole portions 16 if necessary. At this time, a direction in which the securing member 1 is mounted is set such that the lengthwise direction of the base portion 10 is identical to the roof flow direction and the side at which the head insertion hole 42 is provided corresponds to the ridge side.

On the other hand, the solar battery modules 130 are installed on the top board portion 40 of the securing member 1 in a state where the spacer member 82 is interposed between the adjacent frame bodies 131. At this time, the pressurizing member 81 is fitted into between the adjacent frame bodies 131 in a state where lower surfaces of the abutment portions 81c and upper surfaces of the frame bodies 131 abut against each other. Further, the shaft portion 52 of the bolt 50 is inserted through the second supporting hole portion 82h of the spacer member 82 and the first supporting hole portion 81h of the pressurizing member 81, and the bolt 50 is made to slide along the long hole portion 41. With this, in a state where the base portion 10 is mounted on the roof tile R at an appropriate position as described above, the supporting member 80 can be made to slide with respect to the frame bodies 131 so as to adjust a position of the supporting member 80 with respect to the frame bodies 131 to an appropriate position. For example, when one solar battery module 130 is supported by a plurality of supporting members 80, a positional relationship of the supporting members 80 can be adjusted so as to support the solar battery module 130 in a balanced manner. Then, the bolt 50 is fastened with a nut 55 so that the frame bodies 131 are pressurized against the top board portion 40 of the securing member 1 by the pressurizing member 81. Therefore, the solar battery modules 130 can be secured onto the roof tile R through the securing member 1.

It is to be noted that if a cover member 83 is fitted into between one pair of standing plate portions 81b of the pressurizing member 81, an upper portion of the first supporting hole portion 81h and the second supporting hole portion 82h through which the shaft portion 52 of the bolt 50 is inserted is covered by the cover member 83. Therefore, rainwater can be prevented from entering through the hole portions. Further, the supporting member 80 is arranged between an eaves cover or a ridge cover and the solar battery module 130 on an eaves-side end or a ridge-side end in a range where the solar battery module 130 is installed on roof (in FIG. 4, ridge cover 134 is illustrated).

Figure 5:
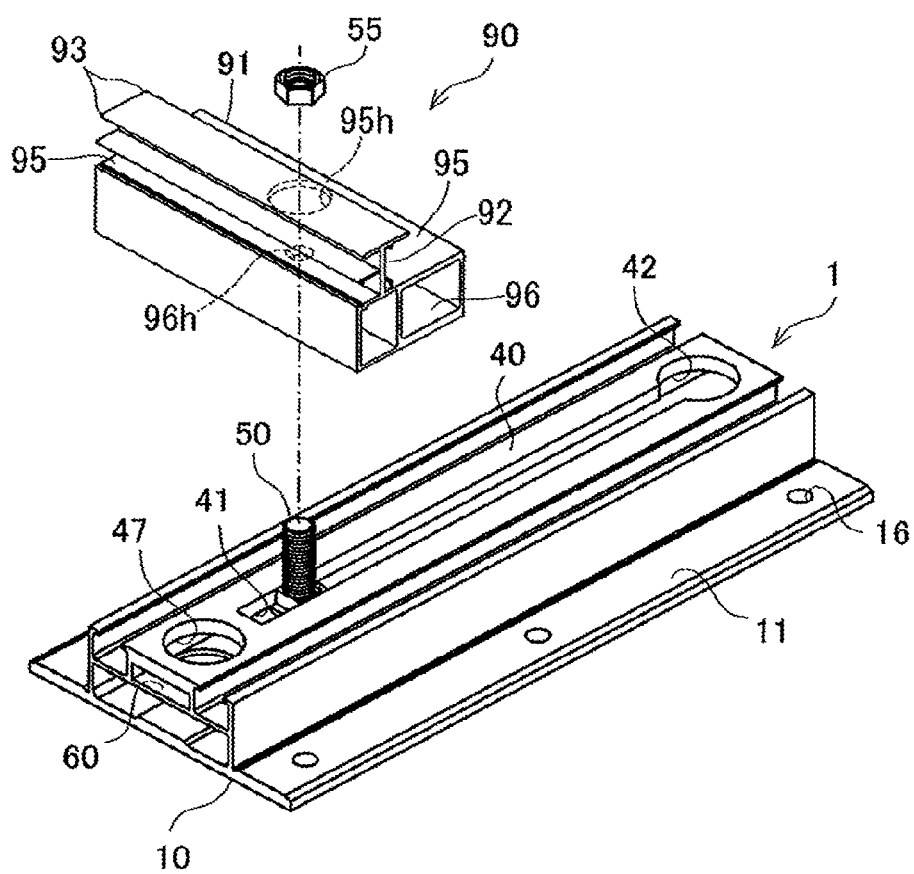
FIG. 5 is a view illustrating another example of securing of the solar battery module onto roof tile by the securing member in FIGS. 1A and 1B, which is different from FIG. 4.

As another example of the supporting member, a case where a table-like supporting member 90 on which a frame body of a solar battery module is installed while the supporting member 90 sandwiches the frame body is used is described with reference to FIG. 5. The supporting member 90 mainly includes a box-shaped base portion 91, an erected portion 92, and a blocking portion 93. The erected portion 92 is erected to the upper side from vicinity of an end side of an upper surface of the base portion 91. The blocking portion 93 extends to both sides from an upper end of the erected portion 92 so as to be parallel with the upper surface of the base portion 91. Further, the base portion 91 includes an installing portion 95 and a mounting portion 96. The frame body of the solar battery module is installed on the installing portion 95. The mounting portion 96 is mounted on the securing member 1. A supporting hole portion 96h through which the shaft portion 52 of the bolt 50 of the securing member 1 is inserted is punctured on the mounting portion 96 in a penetrating manner. Further, an operation hole portion 95h for fastening the nut 55 to the bolt 50 is provided on the installing portion 95 on the same axis of the supporting hole portion 96h.

With the above configuration, an end side of the frame body of the solar battery module is made to abut against the erected portion 92, and the frame body is installed on the installing portion 95 while sandwiching the frame body between the blocking portion 93 and the installing portion 95. This makes it possible to support the solar battery module by the supporting member 90. Further, the shaft portion 52 of the bolt 50 is inserted through the supporting hole portion 96h of the supporting member 90 and the bolt 50 is made to slide along the long hole portion 41. With this, in a state where the base portion 10 is mounted on roof tile at an appropriate position as described above, a position of the supporting member 90 with respect to the frame body can be adjusted to an appropriate position.

On the securing member 1 according to the embodiment, a specific configuration for supporting the solar battery module is not limited to the supporting members 80, 90 having the above configurations as long as a supporting hole portion through which the shaft portion 52 of the bolt 50 can be inserted is provided. The solar battery module can be secured onto the roof tile using various supporting members.

Figure 6:
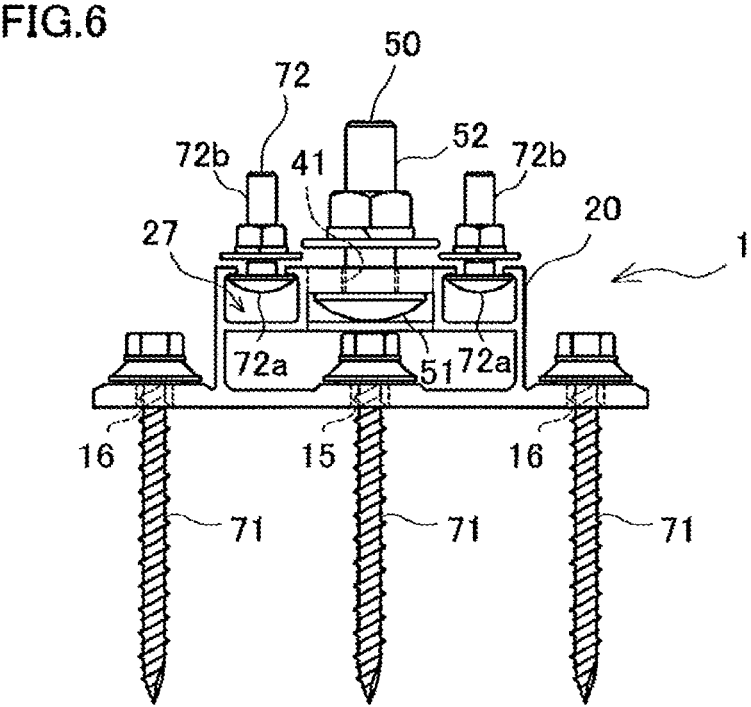
FIG. 6 is a view for explaining mounting of second bolts on the securing member in FIGS. 1A and 1B.

Further, the securing member 1 according to the embodiment includes concave grooves 27 extending in the lengthwise direction. Each concave groove 27 is formed by a standing wall upper portion 22, the step portion 25, and the second standing wall portion 26. The standing wall upper portion 22 is a portion of the standing wall portion 21, which is higher than the step portion 25. Openings of the concave grooves 27 are narrowed by the standing wall portion projecting pieces 23 and the top board portion projecting pieces 43 which project. As illustrated in FIG. 6, the supporting member and the securing member 1 can be connected to each other more firmly by using second bolts 72. Each second bolt 72 includes a shaft portion 72b passing through between the standing wall portion projecting piece 23 and the top board portion projecting piece 43 and a head 72a having such a size that the head 72a does not pass through therebetween. Eventually, the solar battery module can be secured onto the roof tile while being supported by the securing member 1 firmly.

Figure 7:
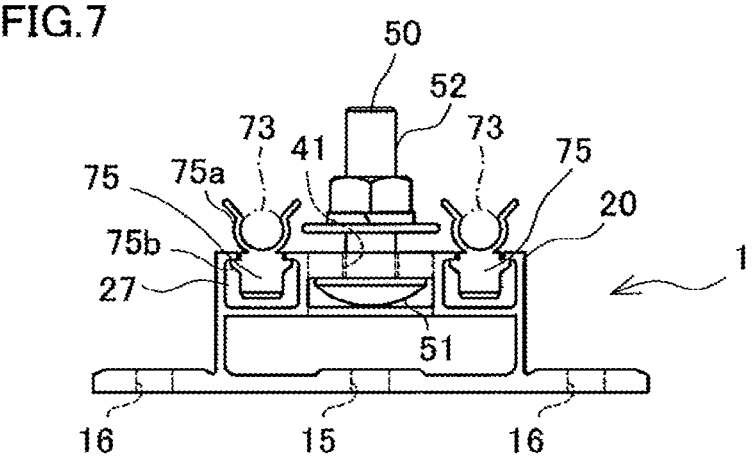
FIG. 7 is a view for explaining mounting of cable holders on the securing member in FIGS. 1A and 1B.

Further, as illustrated in FIG. 7, cable holders 75 can be also mounted on the concave grooves 27. Each cable holder 75 is made of a resin having elasticity and includes a C-shaped cable holding portion 75a, and a hook-like locking claw 75b. With this configuration, if the locking claws 75b are elastically deformed so as to be pressed into the concave grooves 27, the locking claws 75b are locked by the standing wall portion projecting pieces 23 and the top board portion projecting pieces 43. Therefore, the cable holders 75 are secured in a state where the cable holding portions 75*a* are located at positions which are higher than the standing wall portion projecting pieces 23 and the top board portion projecting pieces 43. Accordingly, cables such as output electric wires connected to the bottom surface of the solar battery panel can be held by the cable holding portions 75*a* so as to be collected simply.

Figure 12:
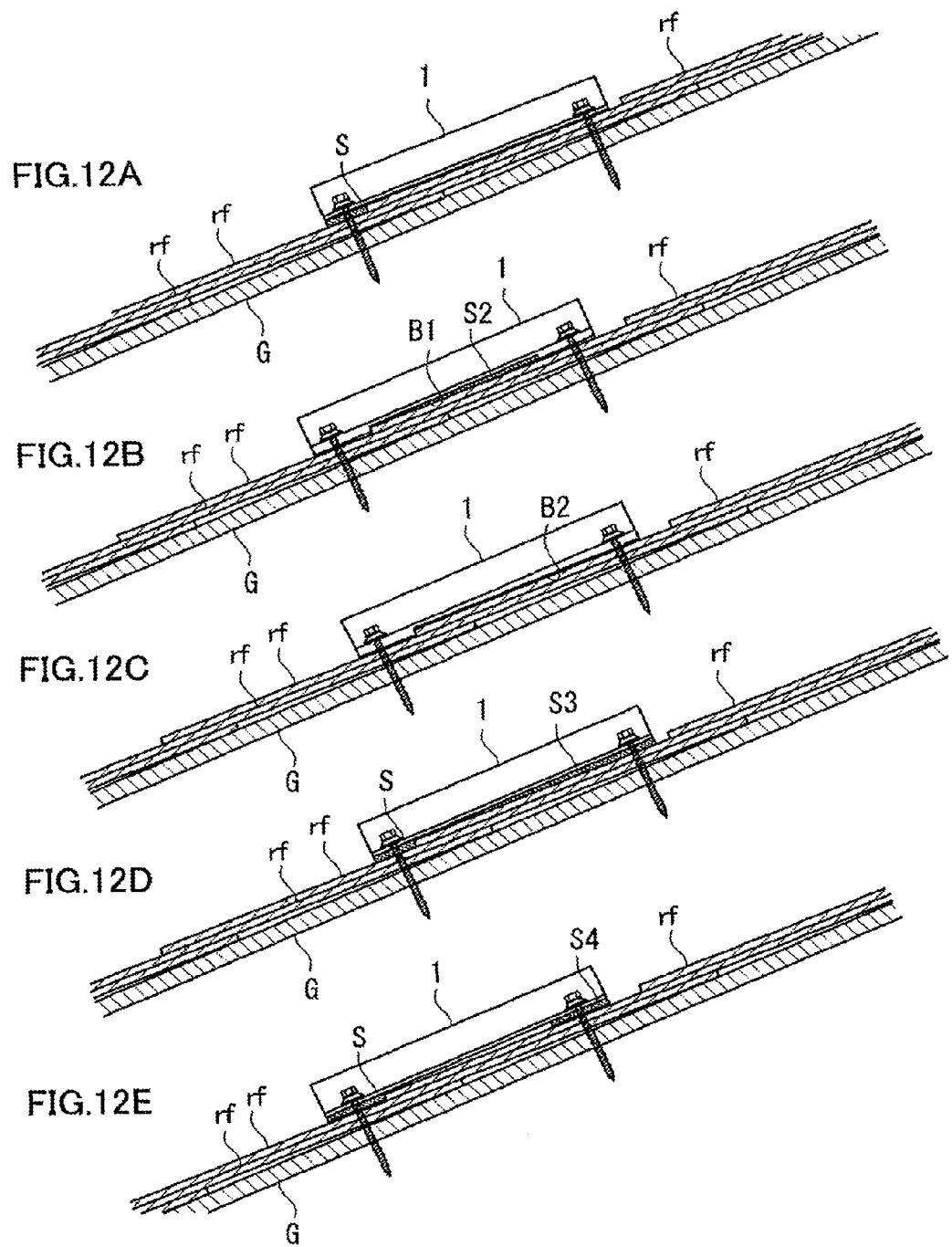
FIGS. 12A-12E are views for explaining angle adjustment of the securing member mounted on the roof tile.

Angle adjustment of the securing member 1 which is mounted on the roof tile is described with reference to FIGS. 12A-12E. A case where the securing member 1 is mounted on roof tile on which roof materials (rf) such as slate plates are laid on roofboard (G) is illustrated. When the securing member 1 is mounted so as to overlap with a boundary of the roof materials (rf) which are laid while parts thereof are overlapped with each other, as illustrated in FIG. 12A, a spacer (S) having a thickness which is equal to a thickness of the roof material (rf) is engaged with a bottom surface of the securing member 1 at an eaves-side end, in general. With this, the securing member 1 is mounted in a state where the bottom surface of the securing member 1 is in parallel with an uppermost roof material (rf), but is inclined with respect to the roofboard (G). Therefore, a bending stress acts on the solar battery module if the solar battery module is tried to be supported by the plurality of securing members 1 mounted at different heights in the roof flow direction.

Then, as illustrated in FIG. 12B, a recess extending in the direction orthogonal to the roof flow direction is provided on a bottom surface B1 of the securing member 1. Further, a material S2 which is easily deformed along a shape of another member, such as a butyl rubber, is arranged on the recess. With this, the bottom surface of the securing member 1 can be made parallel with the roofboard (G). Alternatively, as illustrated in FIG. 12C, the bottom surface of the securing member 1 can be also made parallel with the roofboard (G) by forming a slope corresponding to inclination of the roof material (rf) with respect to the roofboard (G) on a bottom portion B2 of the securing member 1.

Further, as illustrated in FIGS. 12D and 12E, the bottom surface of the securing member 1 can be also made parallel with the roofboard (G) as follows. That is, spacer S3 or S4 which is formed at a slant so as to correspond to inclination of the roof material (rf) with respect to the roofboard (G) is made to be engaged between the bottom surface of the securing member 1 and the roof material (rf) in addition to the above spacer (S) (which has the thickness which is equal to the thickness of the roof material (rf) and is arranged at an eaves-side end).

As illustrated in FIGS. 12B and 12C, when the inclination is adjusted by a shape of the securing member 1 itself, there is a disadvantage that it requires a lot of labor for manufacturing the securing member 1 while there is an advantage that a state where the inclination has been adjusted tends to be kept stably. On the other hand, as illustrated in FIGS. 12D and 12E, when the inclination is adjusted by the spacer S3 or S4, there is a problem that a member used as the spacer S3 or S4 is required to have weather resistance in order to keep a state where the inclination has been adjusted while there is an advantage that the adjustment can be made easily at low cost since the shape of the securing member 1 itself needs not be changed.

Figure 8:
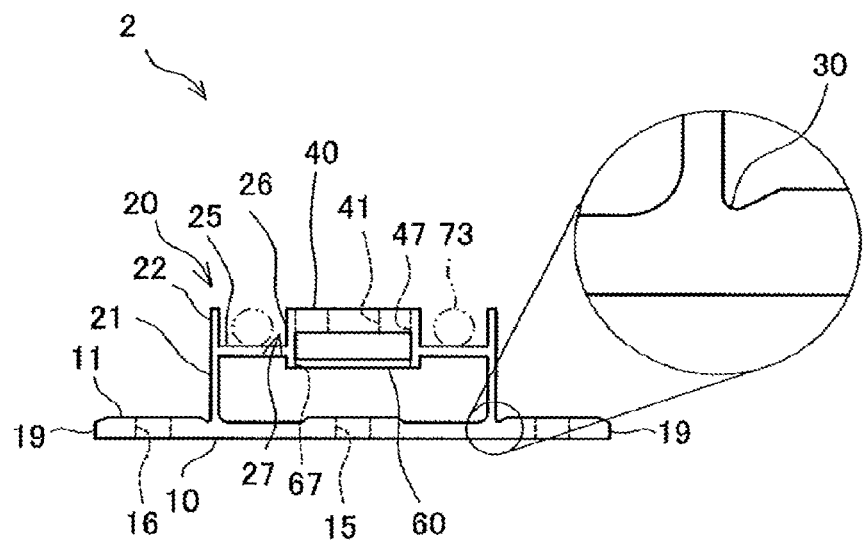
FIG. 8 is a front view illustrating a securing member according to a second embodiment of the invention.
Figure 9:
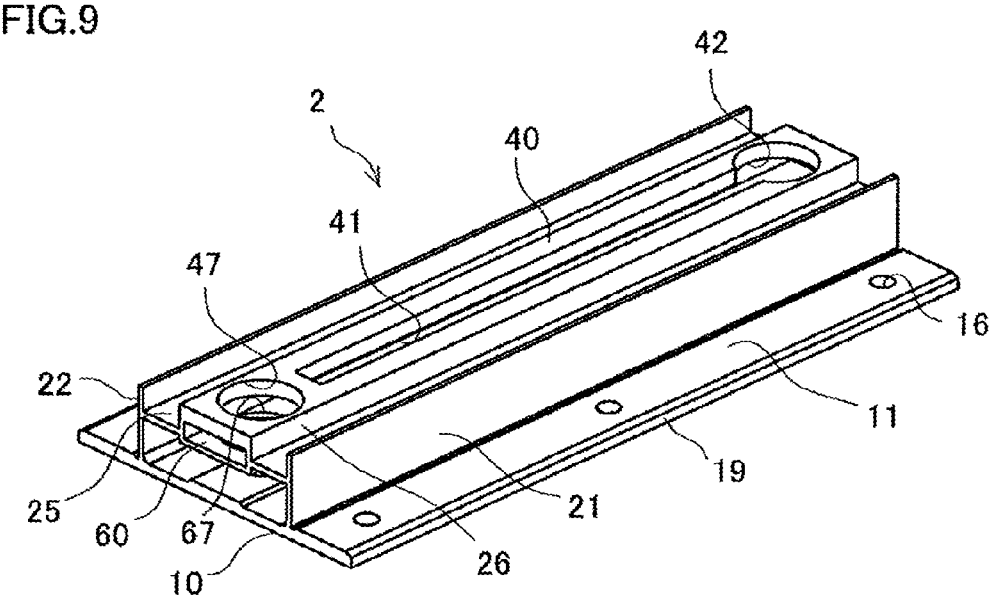
FIG. 9 is a perspective view illustrating the securing member in FIG. 8.

Next, a securing member 2 according to a second embodiment is described with reference to FIG. 8 and FIG. 9. The same reference numerals denote parts having the same configurations as those in the first embodiment and detail description thereof is not repeated. It is to be noted that the bolt is not illustrated in FIG. 8 and FIG. 9.

The securing member 2 includes a flat plate-like base portion 10 which is to be mounted on roof tile, a flat plate-like top board portion 40 which is supported at a position higher than the base portion 10 by a pair of top board supporting portions 20 erected on the base portion 10, a long hole portion 41 which penetrates through the top board portion 40 and of which both ends are closed, a bolt 50 which includes a shaft portion 52 having such a size that the shaft portion 52 passes through the long hole portion 41 and a head 51 having such a size that the head 51 does not pass through the long hole portion 41, and of which shaft portion 52 is inserted through the long hole portion 41 in a state where the head 51 is located at a position lower than the top board portion 40 and is to be inserted through a supporting hole portion provided on a supporting member of a solar battery module, a head insertion hole 42 which has such a size that the head 51 of the bolt 50 passes through the head insertion hole 42, penetrates through the top board portion 40, and communicates with the long hole portion 41 at one end of the long hole portion 41, and securing hole portions 15 which are located on a line obtained by projecting a center axis line (N) of the long hole portion 41 on the base portion 10, and penetrates through the base portion 10. Further, the pair of top board supporting portions 20 are erected from the base portion 10 at positions distanced from a pair of long sides 19 of the base portion 10, and the base portion 10 includes a plurality of auxiliary securing hole portions 16 which penetrate through base side edge portions 11 between the top board supporting portions 20 and the long sides 19, and groove portions 30 which are formed along boundaries between the base side edge portions 11 and the top board supporting portions 20. Further, each of the pair of top board supporting portions 20 includes a standing wall portion 21 which extends to the upper side from the base portion 10, a flat plate-like step portion 25 which extends to the side of the top board portion 40 from a middle point of the standing wall portion 21 and is located at a position lower than the top board portion 40, and a second standing wall portion 26 which extends to the upper side from the step portion 25 so as to reach the top board portion 40.

The second embodiment is different from the first embodiment in a point that the standing wall portions 21 do not include the standing wall portion projecting pieces 23, and the top board portion 40 does not include the top board portion projecting pieces 43. Accordingly, as illustrated in FIG. 8, cables 73 can be accommodated directly in the concave grooves 27 formed by the standing wall upper portions 22, the step portions 25, and the second standing wall portions 26. It is to be noted that the cables 73 accommodated in the concave grooves 27 can be held by providing through holes on the standing wall portions 21, and tying the cables 73 with wires or string-like members inserted through the through holes.

Figure 10:
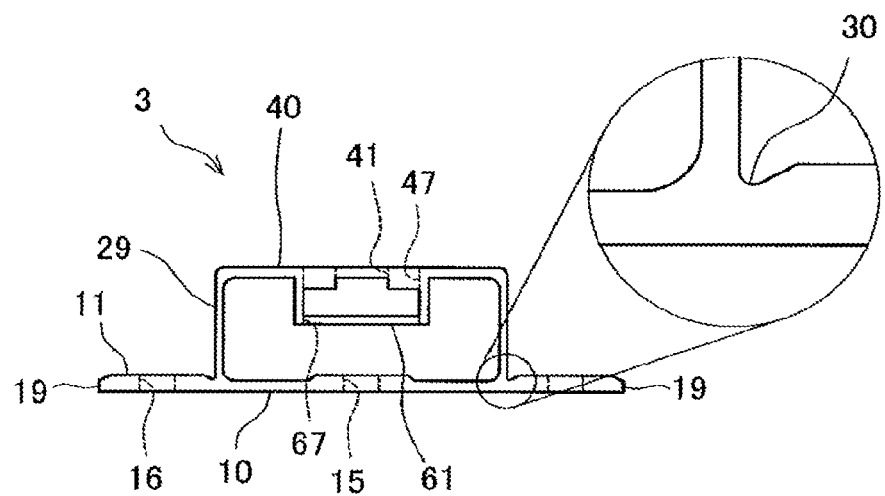
FIG. 10 is a front view illustrating a securing member according to a third embodiment of the invention.
Figure 11:
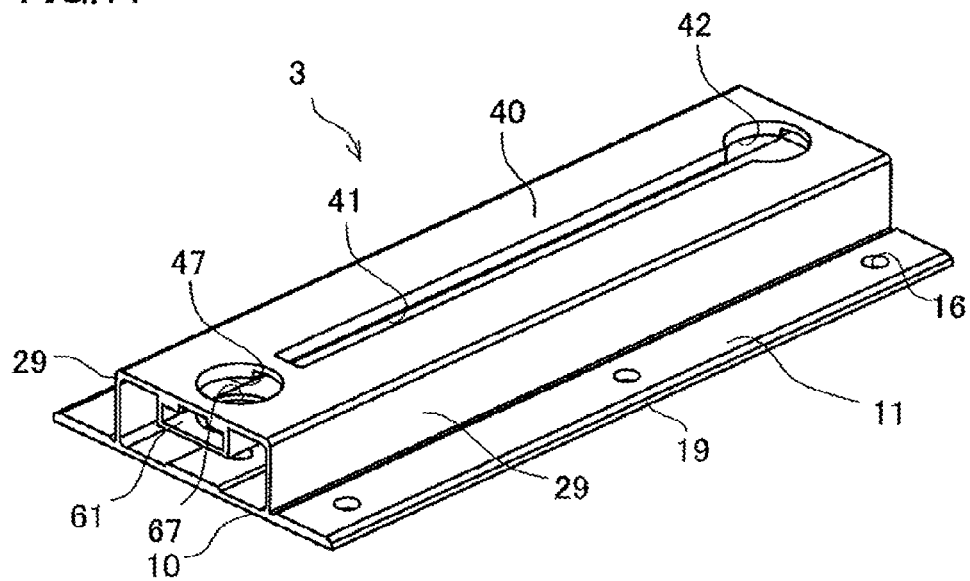
FIG. 11 is a perspective view illustrating the securing member in FIG. 10.

Next, a securing member 3 according to a third embodiment is described with reference to FIG. 10 and FIG. 11. The same reference numerals denote parts having the same configurations as those in the first embodiment and the second embodiment and detail description thereof is not repeated. It is to be noted that the bolt is not illustrated in FIG. 10 and FIG. 11.

The securing member 3 includes a flat plate-like base portion 10 which is to be mounted on roof tile, a flat plate-like top board portion 40 which is supported at a position higher than the base portion 10 by a pair of top board supporting portions 29 erected on the base portion 10, a long hole portion 41 which penetrates through the top board portion 40 and of which both ends are closed, a bolt 50 which includes a shaft portion 52 having such a size that the shaft portion 52 passes through the long hole portion 41 and a head 51 having such a size that the head 51 does not pass through the long hole portion 41, and of which shaft portion 52 is inserted through the long hole portion 41 in a state where the head 51 is located at a position lower than the top board portion 40 and is to be inserted through a supporting hole portion provided on a supporting member of a solar battery module, a head insertion hole 42 which has such a size that the head 51 of the bolt 50 passes through the head insertion hole 42, penetrates through the top board portion 40, and communicates with the long hole portion 41 at one end of the long hole portion 41, and securing hole portions 15 which are located on a line obtained by projecting a center axis line (N) of the long hole portion 41 on the base portion 10, and penetrates through the base portion 10. Further, the pair of top board supporting portions 29 are erected from the base portion 10 at positions distanced from a pair of long sides 19 of the base portion 10, and the base portion 10 includes a plurality of auxiliary securing hole portions 16 which penetrate through base side edge portions 11 between the top board supporting portions 29 and the long sides 19, and groove portions 30 which are formed along boundaries between the base side edge portions 11 and the top board supporting portions 29.

The third embodiment is different from the first embodiment and the second embodiment in a point that one pair of top board supporting portions 29 are erected from the base portion 10 perpendicularly and support the top board portion 40 without bending. Further, a connecting portion 61 is opened to the upper side and has a U-shaped cross section. The connecting portion 61 is provided so as to sandwich the long hole portion 41 at the lower side of the top board portion 40 and bridge between both side edges of the top board portion 40. Accordingly, the securing member having an extremely simple configuration in comparison with those in the first embodiment and the second embodiment, which ensures a function for securing a solar battery module onto roof tile, can be manufactured easily at low cost.

As described above, with the securing members 1, 2, 3 according to the first embodiment to the third embodiment, the base portion 10 is mounted on roof tile, the shaft portion 52 of the bolt 50 is inserted through the supporting hole portion of the supporting member, and then, is fastened with the nut 55. With this, the supporting member can be secured onto the roof tile through the securing member 1. Eventually, the solar battery module can be secured onto the roof tile. At this time, the bolt 50 can be made to slide along the long hole portion 41. Therefore, a mounting position of the securing member 1 on the roof tile, and a mounting position of the supporting member on the solar battery module can be adjusted to appropriate positions.

Further, the securing hole portions 15 are provided on the base portion center line M, and the base portion center line M is identical to a line obtained by projecting the center axis line N of the long hole portion 41 on the base portion 10. Accordingly, the securing member 1 is attached to the roof tile on the same axis as a portion on which the securing member 1 receives load supported by the supporting member through the bolt 50. Therefore, the solar battery module can be secured onto the roof tile stably.

Further, both ends of the long hole portion 41 are closed. Therefore, when the securing member 1 is mounted on the roof tile such that the lengthwise direction of the long hole portion 41 is identical to the roof flow direction, a risk that the bolt 50 is detached to the eaves side and drops is prevented from occurring.

In addition, the solar battery module is not required to have a specific configuration and a specific configuration of the supporting member which supports the solar battery module is not also limited as long as the supporting hole portion is provided thereon. Therefore, the securing members 1, 2, 3 can be widely applied to a common solar battery module and various types of supporting members.

Further, the groove portions 30 are formed along boundaries between the base side edge portions 11 and the top board supporting portions 20. Therefore, rainwater easily flows along the groove portions 30 so as to suppress the rainwater from entering through the auxiliary securing hole portions 16. Moreover, the opening edges 15s of the securing hole portions 15 on the upper surface of the base portion 10 are higher than the upper surface 10s of other positions on the base portion 10. Therefore, even if rainwater flowing down the roof tile flows on the base portion 10, the rainwater can be suppressed from entering through the securing hole portions 15.

Further, the connecting portion 60 or 61 is provided. Therefore, rigidity of the top board portion 40 on which the long hole portion 41 and the head insertion hole 42 are provided is enhanced. In addition, the inverted bolt 50 is prevented from dropping and a state where the shaft portion 52 of the bolt 50 is inserted through the long hole portion 41 can be kept with an extremely simple configuration.

Moreover, each of the securing members 1, 2 according to the first embodiment and the second embodiment includes a pair of concave grooves 27 at both sides of the top board portion 40. Therefore, the cables 73 such as output electric wires can be held on the concave grooves 27.

Further, on the securing member 1 according to the first embodiment, openings of the concave grooves 27 are narrowed. By using this, the number of bolts which are used for connection to the supporting member is increased so that the supporting member and the securing member can be connected to each other more firmly. Alternatively, the cable holders 75 can be mounted on the concave grooves 27 easily. Therefore, the cables 73 such as output electric wires can be held on the cable holders 75.

Hereinbefore, the invention has been described by using preferred embodiments. However, the invention is not limited to the above embodiments and various improvements and changes in design can be made within a range without departing from a scope of the invention.

Figure 13:
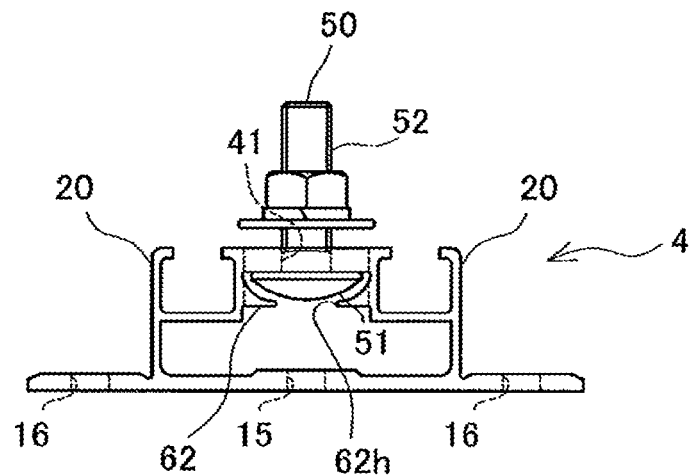
FIG. 13 is a front view illustrating a securing member according to another embodiment.

For example, in the above description, the connecting portion 60 or 61 for enhancing the rigidity of the top board portion 40 and for keeping a state where the shaft portion 52 of the bolt 50 is inserted through the long hole portion 41 is provided. However, as illustrated in FIG. 13, a securing member 4 including a connecting portion 62 on which an opening 62h having such a size that the head 51 of the bolt 50 does not pass through the opening 62h is provided can be configured. Even with this configuration, a state where the shaft portion 52 of the bolt 50 is inserted through the long hole portion 41 can be kept, and a securing member (excluding bolt) can be easily manufactured with extrusion molding by providing the opening 62h.

Figure 14:
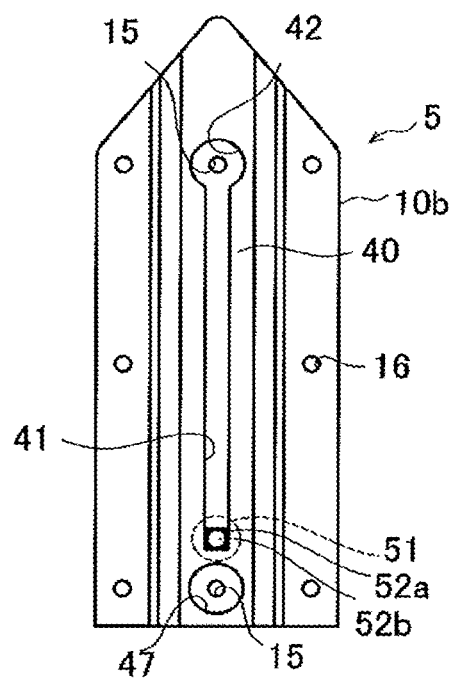
FIG. 14 is a plan view illustrating a securing member according to another embodiment of which outer shape of a base portion is different.
Figure 15:
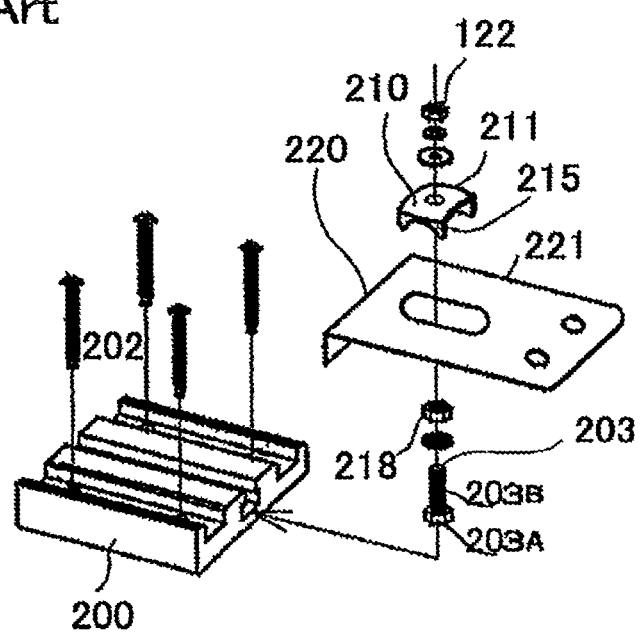
FIG. 15 is a view for explaining a conventional technique (Patent Document 1).

Further, in the above description, an outer shape of the base portion 10 is rectangular when seen from the above. However, the invention is not limited thereto. For example, as illustrated in FIG. 14, a securing member 5 including a base portion 10b having a triangular shape that a ridge-side end projects at a center, or a deck-like shape can be configured. With this shape, rainwater flowing down the roof surface material does not tend to flow up on the base portion 10b. This makes it possible to further decrease a risk that rainwater enters through the securing hole portions 15 and the auxiliary securing hole portions 16.

In addition, in the above description, the bolt which has a circular head and a prismatic shaft portion having a quadrangular prism shape on a root of the shaft portion is used. However, a type of the bolt is not limited thereto. For example, a hexagonal bolt or a bolt with a hexagonal hole can be also used.

As described above, as an effect of the aspect of the invention, a securing member having the reduced number of parts, which can secure a solar battery module onto roof tile at an appropriate position, and can be generally used for a common solar battery module, can be provided.

What is claimed is:

1. A securing member comprising:
a flat plate-like base portion which is to be mounted on roof tile;
a flat plate-like top board portion which is supported at a position higher than the base portion by a pair of top board supporting portions erected on the base portion;
a long hole portion which penetrates through the top board portion and of which both ends are closed;
a bolt which includes a shaft portion having such a size that the shaft portion passes through the long hole portion and a head having such a size that the head does not pass through the long hole portion, and of which shaft portion is inserted through the long hole portion in a state where the head is located at a position lower than the top board portion and is to be inserted through a supporting hole portion provided on a supporting member of a solar battery module;
a head insertion hole which has such a size that the head of the bolt passes through the head insertion hole, penetrates through the top board portion, and communicates with the long hole portion at one end of the long hole portion; and
two securing hole portions which are located on a line obtained by projecting a center axis line of the long hole portion on the base portion, and which penetrate through the base portion,
wherein a first one of said securing hole portions is provided at a position directly under the head insertion hole, such that said one of said securing hole portions is accessible through said head insertion hole, and a second one of said securing hole portions is not provided at a position directly under the head insertion hole, such that said second one of said securing hole portions is not accessible through said head insertion hole,
wherein each of the pair of top board supporting portions includes a first standing wall portion which extends upwards from the base portion, a flat plate-like step portion which extends to the side of the top board portion from a middle point of the first standing wall portion and is located at a position lower than the top board portion, and a second standing wall portion which extends upwards from the step portion so as to reach the top board portion,
wherein the first standing wall portions reach the same height as the top board portion and include standing wall portion projecting pieces which extend to the side of the top board portion from upper ends of the first standing wall portions, and
wherein the top board portion includes top board portion projecting pieces which extend to the side of the first standing wall portions from intersections between the top board portion and the second standing wall portions and are opposed to the standing wall portion projecting pieces.

2. A securing member comprising:
a flat plate-like base portion which is to be mounted on roof tile;
a flat plate-like top board portion which is supported at a position higher than the base portion by a pair of top board supporting portions erected on the base portion;
a long hole portion which penetrates through the top board portion and of which both ends are closed;
a bolt which includes a shaft portion having such a size that the shaft portion passes through the long hole portion and a head having such a size that the head does not pass through the long hole portion, and of which shaft portion is inserted through the long hole portion in a state where the head is located at a position lower than the top board portion and is to be inserted through a supporting hole portion provided on a supporting member of a solar battery module;
a head insertion hole which has such a size that the head of the bolt passes through the head insertion hole, penetrates through the top board portion, and communicates with the long hole portion at one end of the long hole portion; and
two securing hole portions which are located on a line obtained by projecting a center axis line of the long hole portion on the base portion, and which penetrate through the base portion,
wherein a first one of said securing hole portions is provided at a position directly under the head insertion hole, such that said one of said securing hole portions is accessible through said head insertion hole, and a second one of said securing hole portions is not provided at a position directly under the head insertion hole, such that said second one of said securing hole portions is not accessible through said head insertion hole,
wherein the pair of top board supporting portions are erected from the base portion at positions distanced from a pair of sides of the base portion,
wherein the base portion includes a plurality of auxiliary securing hole portions which penetrate through base side edge portions between the top board supporting portions and the sides, and groove portions which are formed along boundaries between the base side edge portions and the top board supporting portions,
wherein each of the pair of top board supporting portions includes a first standing wall portion which extends upwards from the base portion, a flat plate-like step portion which extends to the side of the top board portion from a middle point of the first standing wall portion and is located at a position lower than the top board portion, and a second standing wall portion which extends upwards from the step portion so as to reach the top board portion,
wherein the first standing wall portions reach the same height as the top board portion and include standing wall portion projecting pieces which extend to the side of the top board portion from upper ends of the first standing wall portions, and
wherein the top board portion includes top board portion projecting pieces which extend to the side of the first standing wall portions from intersections between the top board portion and the second standing wall portions and are opposed to the standing wall portion projecting pieces.

* * * * *